United States Patent
Mandadi et al.

(10) Patent No.: US 11,574,070 B2
(45) Date of Patent: *Feb. 7, 2023

(54) APPLICATION SPECIFIC SCHEMA EXTENSIONS FOR A HIERARCHICAL DATA STRUCTURE

(71) Applicant: Amazon Technologies, Inc., Seattle, WA (US)

(72) Inventors: Srikanth Mandadi, Redmond, WA (US); Mahendra Manshi Chheda, Sammamish, WA (US); Alazel Acheson, Redmond, WA (US); Daniel Stephen Popick, Seattle, WA (US); James Robert Englert, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 22 days.

This patent is subject to a terminal disclaimer.

(21) Appl. No.: 16/919,305

(22) Filed: Jul. 2, 2020

(65) Prior Publication Data
US 2020/0334374 A1 Oct. 22, 2020

Related U.S. Application Data

(63) Continuation of application No. 15/475,020, filed on Mar. 30, 2017, now Pat. No. 10,706,166.

(51) Int. Cl.
G06F 21/62 (2013.01)
G06F 16/22 (2019.01)
(Continued)

(52) U.S. Cl.
CPC .......... G06F 21/6218 (2013.01); G06F 16/22 (2019.01); G06F 16/2379 (2019.01); H04L 67/1097 (2013.01)

(58) Field of Classification Search
CPC .. G06F 21/6218; G06F 16/22; G06F 16/2379; H04L 67/1097
(Continued)

(56) References Cited

U.S. PATENT DOCUMENTS 6,578,046 B2 6/2003 Chang et al.
6,721,758 B1 4/2004 Jex et al.
(Continued)

OTHER PUBLICATIONS

U.S. Appl. No. 15/132,098, filed Apr. 18, 2016, Srikanth Mandadi, et al.
(Continued)

*Primary Examiner* — Amare F Tabor
(74) *Attorney, Agent, or Firm* — S. Scott Foster; Kowert, Hood, Munyon, Rankin & Goetzel, P.C.

(57) ABSTRACT

A schema for a hierarchical data structure may include application specific extensions to the schema applied to a hierarchical data structure. Class may be added to the schema by individual applications granted access to a hierarchical data structure. When an access request for an object of the hierarchical data structure is received, the class may be identified in the schema and applied to process the access request to the object. Different classes may be added by different applications without disrupting the utilization of the schema for accessing the hierarchical data structure of other applications.

20 Claims, 12 Drawing Sheets

(51) Int. Cl.
*G06F 16/23* (2019.01)
*H04L 67/1097* (2022.01)

(58) Field of Classification Search
USPC .......................................................... 726/30
See application file for complete search history.

(56) References Cited

U.S. PATENT DOCUMENTS

| | | | |
|---|---|---|---|
| 7,117,504 B2 | 10/2006 | Smith et al. | |
| 7,194,472 B2 | 3/2007 | Excoffier et al. | |
| 7,296,022 B2 | 11/2007 | Harjanto | |
| 7,599,948 B2 | 10/2009 | Thompson et al. | |
| 7,603,393 B1 | 10/2009 | Cote et al. | |
| 7,620,630 B2 | 11/2009 | Lloyd et al. | |
| 7,620,658 B2 | 11/2009 | Benson et al. | |
| 7,822,711 B1 | 10/2010 | Ranade | |
| 8,661,459 B2* | 2/2014 | Gandhi | G06F 21/51 719/328 |
| 8,868,506 B1 | 10/2014 | Bhargava et al. | |
| 8,880,474 B2 | 11/2014 | Mason et al. | |
| 8,897,820 B2 | 11/2014 | Marovets | |
| 9,098,476 B2* | 8/2015 | Obasanjo | G06F 40/137 |
| 9,294,482 B2* | 3/2016 | Mellor | G06F 16/211 |
| 10,133,767 B1* | 11/2018 | Cole | G06F 16/245 |
| 10,372,483 B2 | 8/2019 | Beiter et al. | |
| 10,445,334 B1* | 10/2019 | Xiao | G06F 16/258 |
| 2009/0259683 A1 | 10/2009 | Murty | |
| 2010/0030752 A1 | 2/2010 | Goldentouch | |
| 2010/0174692 A1 | 7/2010 | Meyer et al. | |
| 2013/0097136 A1 | 4/2013 | Goldberg | |
| 2017/0228821 A1 | 8/2017 | Reimer | |
| 2018/0089249 A1* | 3/2018 | Collins | G06F 16/2365 |

OTHER PUBLICATIONS

U.S. Appl. No. 15/475,020, filed Mar. 30, 2017, Srikanth Mandadi et al.

"Azure AD: Under the hood of our geo-redundant, highly available, distributed cloud directory," Alex Simons, Sep. 2, 2014, available at https://blogs.technet.microsoft.com/ad/2014/09/02/azure-ad-under-the-hood-of-our-geo-redundant-highly-available-distributed-cloud-directory/#, pp. 1-9.

"Azure AD Graph API Directory Schema Extensions—Directory schema extensions | Graph API concepts", Retrieved from URL: https://msdn.microsoft.com/en-us/library/azure/ad/graph/howto/azure-ad-graph-api-directory-schema-extensions on Mar. 30, 2017, pp. 1-11.

U.S. Appl. No. 15/475,024, filed Mar. 30, 2017, Alazel Acheson, et al.

U.S. Appl. No. 15/475,007, filed Mar. 30, 2017, Mahendra Manshi Chheda, et al.

* cited by examiner

APPLICATION SPECIFIC SCHEMA EXTENSIONS FOR A HIERARCHICAL DATA STRUCTURE

This application is a continuation of U.S. patent application Ser. No. 15/475,020, filed Mar. 30, 2017, which is hereby incorporated by reference herein in its entirety.

BACKGROUND

Hierarchical storage systems offer users a way to persist hierarchical data structures. Hierarchical data structures stored in such hierarchical storage systems may provide users with the ability to store and managed related data in way that reflects the relationships between the data. Such hierarchical structures may be used to implement many different services, including resource management systems, directory systems, payroll systems, and other systems that leverage data relationships to reason over the data stored therein. Techniques that optimize interactions with hierarchical storage systems, reducing user burden and providing greater management flexibility may be highly desirable, such as techniques that increase the consistency with which multiple applications can access the same hierarchical data structure.

BRIEF DESCRIPTION OF THE DRAWINGS

FIGS. 1A-1C are logical block diagrams illustrating application specific extensions to a schema for a hierarchical data structure, according to some embodiments.

Figure 1B:
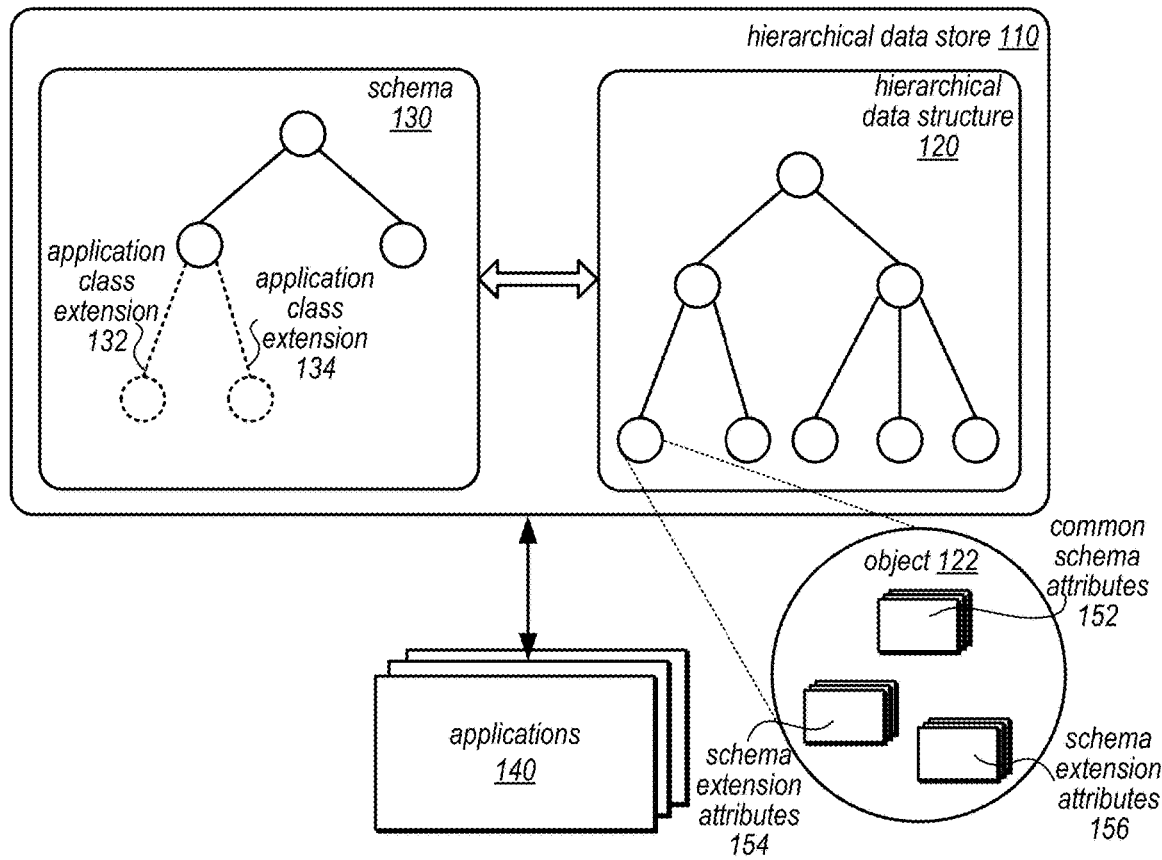

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of application specific extensions to a schema for a hierarchical data structure are described herein. A hierarchical data store, such as a directory data store, may allow users to programmatically manage data using client-side applications that access data stored in the hierarchical data store in order to perform different operations. Some data stored in the hierarchical data structure may be useful to multiple different applications. However, applications may also rely upon data that is specific to the operations of an individual application. A schema for the hierarchical data structure may define or otherwise describe the data that is maintained for a hierarchical data structure. In order to allow applications to add further data for different operations, changes to the schema may be coordinated. Application specific extensions to a schema may allow schema changes to be made without interfering with the performance of other applications. For example, one or more classes may be added to a schema on behalf of one application in order to provide specific data to be used by the application without modifying other classes or data in the schema that are utilized by other applications, allowing for the independent development and operation of applications that access the same hierarchical data structure. Moreover, the additions to the schema may become useful to other applications over time, and thus may be accessible to the other applications, in some embodiments.

FIG. 1A is a logical block diagram illustrating application specific extensions to a schema for a hierarchical data structure, according to some embodiments. A hierarchical data structure, such as hierarchical data structure 120 may be stored as part of a hierarchical data store 110. A hierarchical data structure may include one or multiple objects organized according to one or multiple links that provide relationships, paths or other form hierarchy between objects. In this way, the relationship of objects, and data values associated or stored as part of the objects, can be modeled and maintained in the data structure. For example, an organization chart indicating the reporting structure between company managers and employees can be modeled in a hierarchical data structure that indicates the relationship between employees, and may include data specific to each employee (e.g., name, assignment, years of service, etc.).

In at least some embodiments, a schema, such as scheme 130, may be applied to a hierarchical data structure to further define the different relationships between objects. For example, each employee may be an instance of an employee class defined in a schema for the hierarchical data structure, some employees may also be instances of a manager class, and some employees may instances of an executive class. Each class may include attributes and other values which may be automatically allocated to (or defined for) an object that is the instance of that class. For example, the executive class may include an attribute for managed business units. When creating or updating an object of the executive class managed business unit values can be stored. A client application accessing the hierarchical data structure can understand from the schema that an executive object is expected to (or possibly can) have values for managed business units.

Multiple applications 140 may be granted access to the same hierarchical data structure 120. For example, each application may request, register, associate, apply, or otherwise gain permission and access credentials to access hierarchical data structure 120. Each of the applications 140 may have access to data stored in hierarchical data structure according to schema 130. Some portions of schema 130 may be common portions (e.g., portions that exist when applications first gain access to the hierarchical data structure), while some portions may be created for different applications, such as application class extensions 132 and 134, in order to enhance, add, or otherwise adapt the data that is maintained in the hierarchical data structure 120 for different use cases, operations, or scenarios that applications 140 may perform or experience. For example, if hierarchical data structure stores employee directory data, such as name, title, location, then different applications may be developed to interact with the employee data but include further information for different operations. A vacation management tool, for example, may store available paid time off or sick days for individual employees, as well as accrual rates for additional paid time off or sick days. Another application, such as a human resource application, can track salary information, management or reporting information, performance reviews, salary data, etc.

Application class extensions can be applied to allow each application to specify additional data (or other class provided functionality) to maintain in order to facilitate the operations of that application, in various embodiments. This application specific data may then remain isolated from other applications (unless permission is granted), in one embodiment. While in another embodiment, the application specific data created by the class may be automatically shared or made available to another application. Creation of application specific class extensions may be performed without any coordination amongst applications 140, so that development of applications 140 can proceed independently (e.g., including the ability to add additional features and correct bugs without affecting the operations of other applications accessing hierarchical data structure 120.) For example, schema class extensions may be validated prior to inclusion in the schema, as discussed below with regard to FIG. 9, so that inclusion of a class does not break, block, or otherwise disrupt the operation of other applications that can access the hierarchical data structure. In another example, data values, information or other attributes that are specific to a particular application may only be visible to that application (e.g., according to permissions or other information included in a definition for an application-specific extension). In this way, schema extension attributes can be isolated from changes made by other applications and private.

As illustrated in FIG. 1A, object 122 includes common schema attributes 152 and schema extension attributes 154 and 156. Common schema attributes 152 may be data that is accessible and visible to any application 140. However, schema extension attributes may be limited to a particular application for which the schema was extended. For instance, in FIG. 1B, application 140a may access 162 object 122. In addition to common schema attributes 152, schema extension attributes 154 may be visible to application 140a, as the schema extension defining schema extension attributes 154 may be for application 140a. Likewise, in FIG. 1C, application 140b may access 164 object 122. In addition to common schema attributes 152, schema extension attributes 156 may be visible to application 140b, as the schema extension defining schema extension attributes 154 may be for application 140b. In this way, both applications 140a and 140b can safely interact with the same hierarchical data structure, customizing the data maintained in the hierarchical data structure, without interfering with the schema or performance of the other application. Note that in other embodiments, schema class extensions may be publicly available for read access to other applications. Thus, application 140*b*, for instance, may be able to write or otherwise update schema extension attributes 154 and read (but not update) schema extension attributes 156.

Figure 1B:
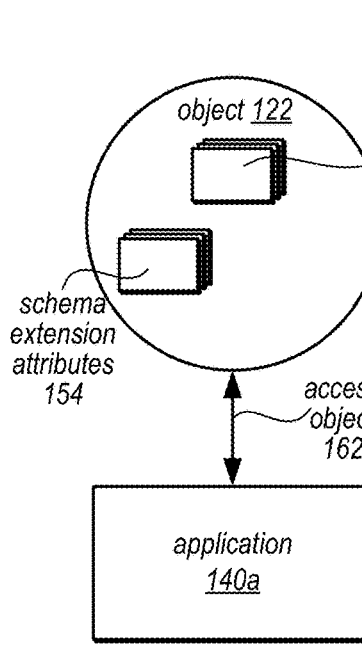
Figure 1C:
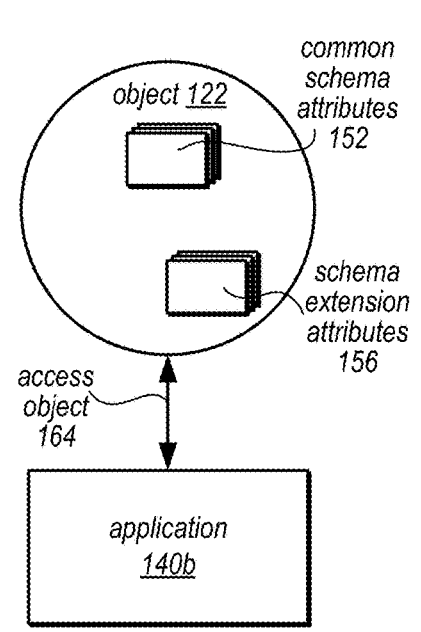

Please note, FIGS. 1A-1C are provided as a logical illustration of a hierarchical data structure with application specific extensions for a schema for the hierarchical data structure, and is not intended to be limiting as to the physical arrangement, size, or number of components, modules, or devices, implementing applications, a hierarchical data store, schema, or hierarchical data structure.

The specification first describes an example of a distributed hierarchical data store as a network-based directory storage service, according to various embodiments. The example directory storage service may store hierarchical data structures for many different clients, in various embodiments. Included in the description of the example directory storage service are various aspects of the example directory storage service along with the various interactions between the directory storage service and clients. The specification then describes a flowchart of various embodiments of methods for application specific extensions to a schema for a hierarchical data structure. Next, the specification describes an example system that may implement the disclosed techniques. Various examples are provided throughout the specification.

Figure 2:
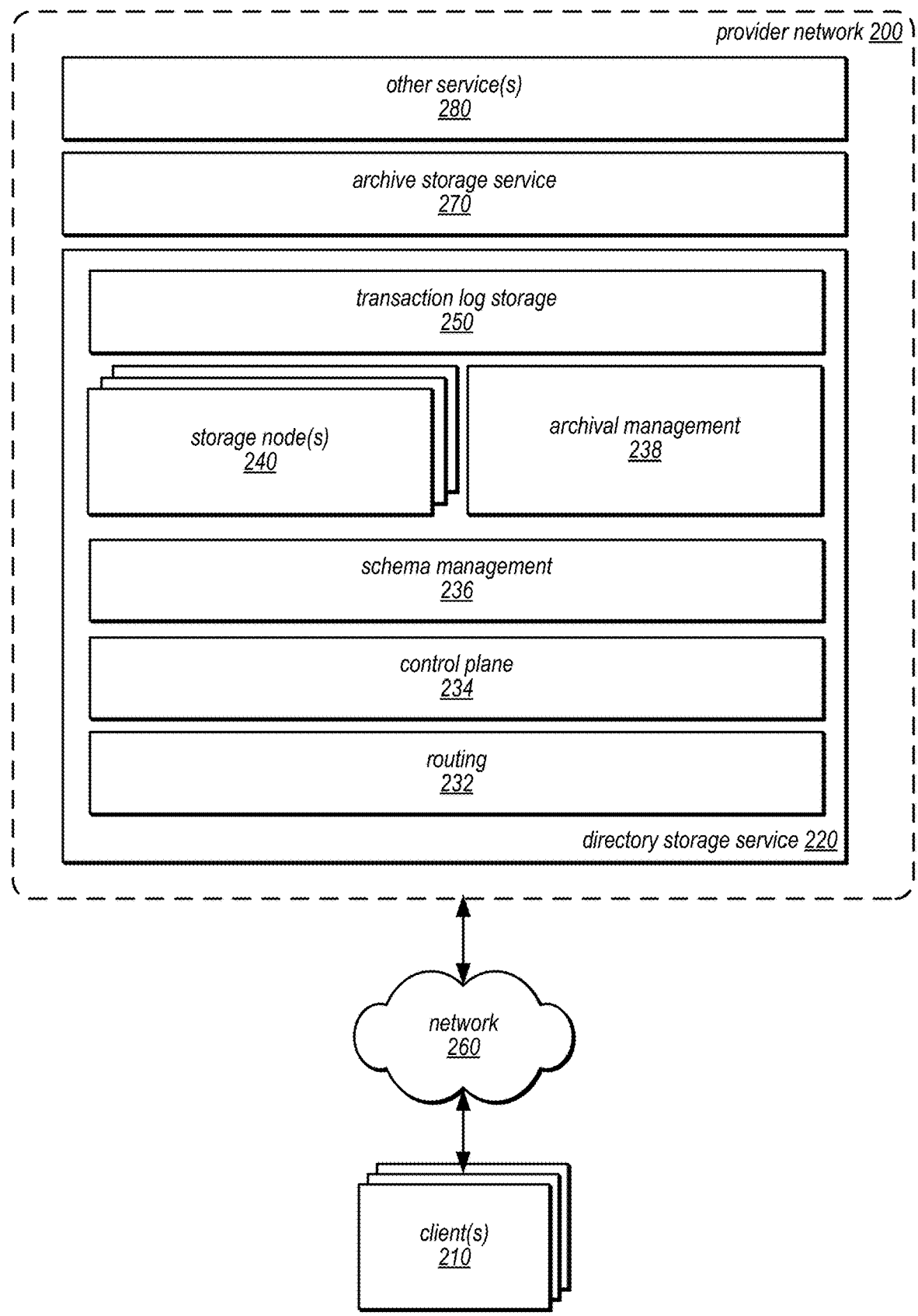
FIG. 2 is a logical block diagram illustrating a provider network that implements a directory storage service including a hierarchical data store that implements application specific extensions to a schema for a hierarchical data structure, according to some embodiments.

FIG. 2 is a logical block diagram illustrating a provider network that implements a directory storage service including a hierarchical data store that implements application specific extensions to a schema for a hierarchical data structure, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and services offered by the provider network 200. In some embodiments, provider network 200 may implement a directory storage service 220, described, provide other computing resources or services, such as a virtual compute service and storage services, such as object storage services, block-based storage services, data warehouse storage service, archive storage service 270 and/or any other type of network based services 280 (which may include various other types of storage, processing, analysis, communication, event handling, visualization, and security services, such as a code execution service that executes code without client management of the execution resources and environment). Clients 210 may access these various services offered by provider network 200 via network 260. Likewise network-based services may themselves communicate and/or make use of one another to provide different services. For example, various ones of other service(s) 280 may store, access, and/or rely upon hierarchical data structures stored in directory storage service 220 or may execute code associated with an object in a hierarchical data structure stored in directory storage service 220.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Directory storage service 220 may store, manage, and maintain hierarchical data structures, such as a directory structure discussed below with regard to FIG. 4, stored at various ones of storage node(s) 240 (in single tenant or multi-tenant fashion). Clients of directory storage service 220 may operate on any subset or portion of the hierarchical data structure with transactional semantics and/or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical directory structure (e.g., reading parts of the hierarchical directory structure, adding an object, and indexing some of the object's attributes, while imposing the requirement that the resulting updates of the operations within the transaction are isolated, consistent, atomic and durably stored).

In various embodiments, directory storage service 220 may implement routing layer 232 to direct access requests from internal or external clients to the appropriate storage node(s) 240. For example, routing layer 232 may implement a fleet of routing nodes that maintain mapping information which identifies the locations of a hierarchical data structures on storage node(s) 240. When an access request is received, routing layer nodes may then determine which one of the storage node(s) that hosts the hierarchical data structure identified in the access request to send the access request. Consider a scenario where hierarchical data structures may be replicated across multiple different storage nodes 240 as part of a replica group. Routing 232 may implement various load balancing schemes to direct requests from different clients to different hierarchy storage nodes within the replica group, so that no single storage node becomes overburdened. Moreover, as storage nodes 240 may utilize tokens to maintain state across different access requests sent by clients so that different hierarchy storage node(s) 240 may handle each request from the client, routing 232 need not track which storage node is communicating with which client.

Control plane 234 may implement various control functions to manage the storage node(s) 240 and other components of directory storage service 220 that provide storage of hierarchical data structures, such as directing creation and placement of new hierarchical data structures on storage node(s) 240, storage scaling, heat management, node repair and/or replacement. For example, various placement schemes may utilize techniques such as consistent hashing (e.g., based on hashing an identifier for individual hierarchical data structures) to identify storage node(s) to store versions of the hierarchical data structure, or randomly mapping hierarchical data structures to a number hierarchy storage node(s) 240 that form a replica set. To provide heat management, for example, control plane 234 may collect storage node(s) 240 metrics published by each node. Each host may have various thresholds for performance characteristics, such as memory utilization, CPU utilization, disk utilization, and request-rate capacity. When a hierarchy storage node reports metrics that exceed a threshold (or multiple thresholds), control plane 234 may direct the migration of one or more hierarchical data structures to different storage nodes. Similarly, control plane 234 may detect when certain storage nodes are unable to keep up with access requests directed to a particular replica group for a hierarchical data structure and may provision additional storage node(s) to horizontally scale the replica group to better meet the access request demand.

Figure 3:
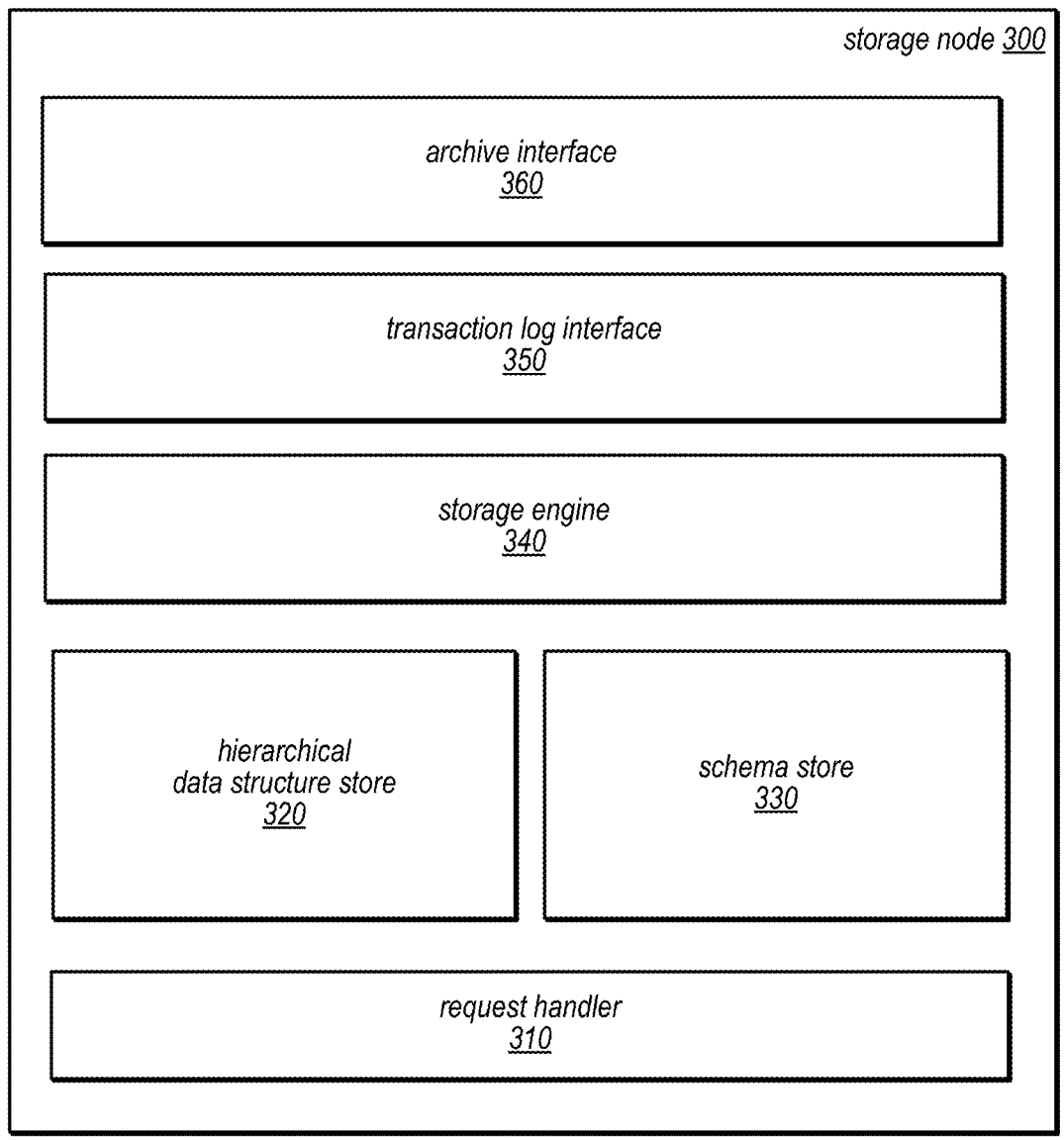
FIG. 3 is a logical block diagram illustrating a hierarchy storage node, according to some embodiments.

Storage node(s) 240 may maintain and handle access to hierarchical storage nodes in directory storage service 220. FIG. 3 is a block diagram illustrating a hierarchy storage node, according to some embodiments. Hierarchy storage node 300 may implement request handler 310 to process access requests and pass along appropriate instructions or requests to other components, such as storage engine 340, transaction log interface 350 or archive interface 360. For example, access request handler 310 may interpret various requests formatted according to a programmatic interface, such as an application programming interface (API). Access requests may include various, such as various access requests to create, update, attach, detach, delete and query objects in a hierarchical data structure, and access requests to define, populate, discover, and query a local index (which may be strongly consistent and maintained as part of or separately from the hierarchical data structure) on hierarchical data structure object attributes, as discussed below with regard to FIG. 7.

Figure 4:
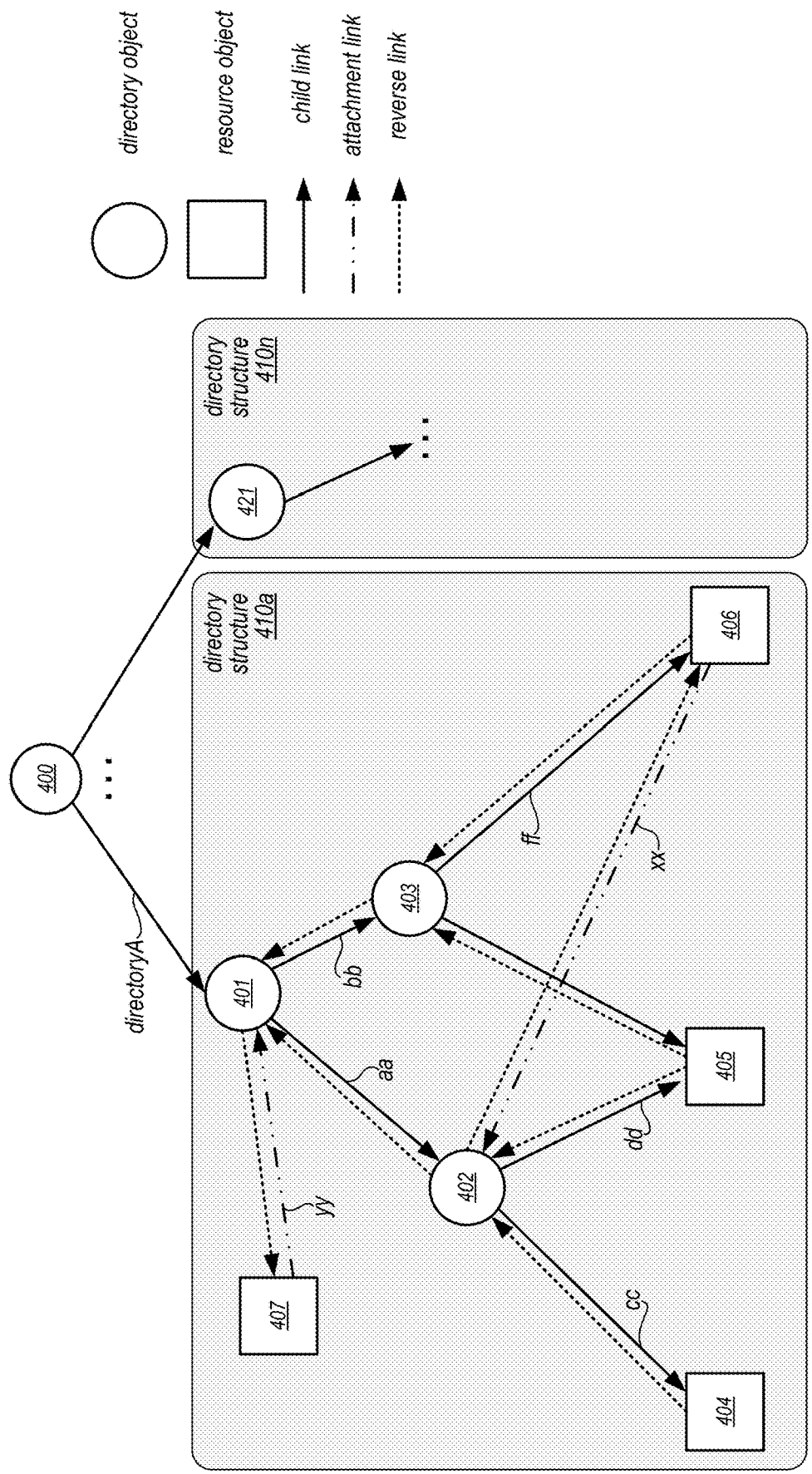
FIG. 4 is a logical block diagram illustrating a data model for a hierarchal data structure in a hierarchical data store, according to some embodiments.
Figure 5:
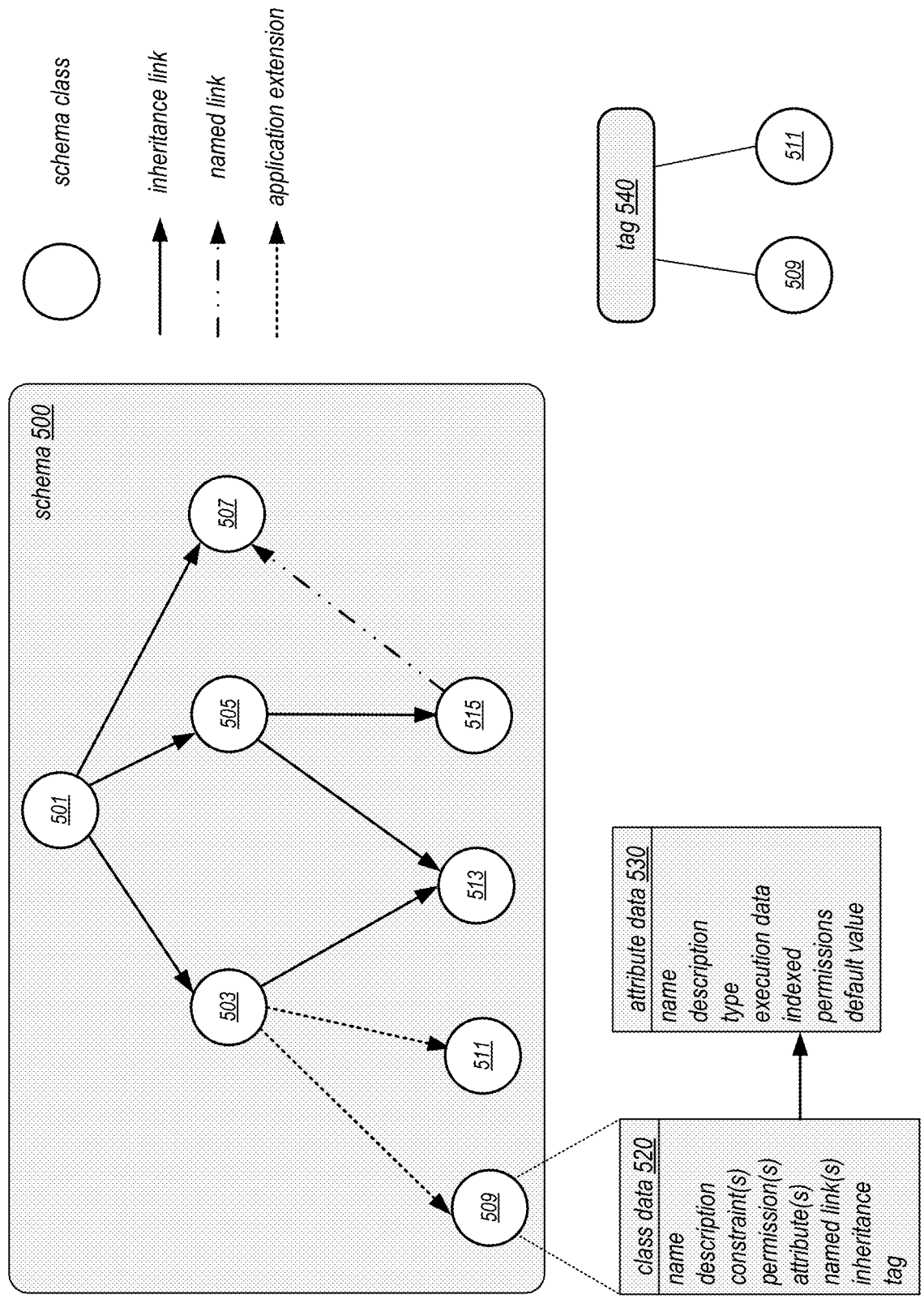
FIG. 5 is a logical block diagram illustrating a data model for a schema applicable to a hierarchal data structure in a hierarchical data store, according to some embodiments.

In various embodiments, storage engine 340 may be a storage engine that interacts with structure or format of data as it is stored in hierarchical data structure store 320 (e.g., a key-value storage engine for data maintained in key-value storage format, relational data storage engine for data maintained in a relational storage format, etc.) and schema store 330 which may maintain a schema that is applied to the hierarchical data structure maintained in hierarchical data structure store 320, which may be maintained according to the models discussed below with regard to FIGS. 4 and 5. In some embodiments, hierarchical data structure store 320 may be partially or completely implemented in memory or other quick access storage devices, such as random access memory devices (RAM), as well as utilizing persistent block-based storage devices to store historical hierarchical data structure 330, including magnetic disk or solid state drives. In some embodiments, caching techniques may be implemented so that frequently accessed portions of data, such as frequently access portions of hierarchical data structures are maintained in memory components whereas other portions are maintained in block-based persistent storage components. Storage node 300 may operate multi-tenant storage for hierarchical data structures so that different hierarchical data structures maintained on behalf of different clients, accounts, customers, and the like may be maintained in hierarchical data structure store 320 and schemas applied to the hierarchical data structures in schema store 330. For example, storage node 300 may participate in different replica groups with different storage nodes for the different hierarchical data structures stored at storage node 300.

Transaction log interface 350 may provide capabilities to interact with (e.g., validate transactions) with respect to the logs corresponding to hierarchical data structures stored in transaction log storage 250 for the hierarchical data structures, according to the various techniques. Transaction log storage 250 may provide consistent storage for versioned hierarchical data structures, according to some embodiments. Multiple clients may perform various access requests to a hierarchical data structure concurrently, such as various write requests. In a least some embodiments, a replica group may include multiple storage nodes that maintain versions of the hierarchical data structure that are available for servicing various access requests from the multiple clients. For example, clients can submit different write requests to storage nodes according to a routing layer (e.g., routing layer 232) which may direct access requests from each client to a different storage node in the replica group according to a load balancing scheme. Upon receiving the request, each storage node may perform various operations upon a version of the hierarchical data structure at the storage node, then offer the writes to transaction log storage 210 for commitment to directory structure log stored in transaction log storage (including various information such as the affected or accessed data by performing the write request, the write request itself, and a transaction sequence number of other indication identifying the point-in-time of the current version of the hierarchical data structure at the storage node). Indications of commitment or conflict may be provided back from transaction log storage 250 to the respective storage nodes. For those writes that are committed, the directory structure log may be read and committed writes applied to the respective versions of the hierarchical data structure maintained at the multiple storage nodes.

Similarly, archive interface 360 may be implemented to retrieve archived transactions or snapshots to service an access request for historical changes to the hierarchical data structure, a historical query, or other access requests that require a version of the hierarchical data structure that is older than that maintained in hierarchical data structure store 320. In some embodiments, an archival management layer 238 may utilize transactions stored for different hierarchical data structures stored in respective transaction logs in transaction log storage 250 to generate and store snapshots of the hierarchical data structure at different points in time in archive storage service 270. For example, archival management 238 may determine when snapshots of a hierarchical data structure should be captured, provision appropriate storage locations in archive storage service 270, and direct archive worker nodes (not illustrated) to perform the read, write, and other operations to generate and place the snapshots in archive storage service 270. Similarly, archival management 238 may direct the copying and storage of individual log records/transactions and/or groups of log records and transactions to be stored as part of an archived transaction log for hierarchical data structures in archive storage service 270. Archival management 238 may read the hierarchical data structure log to retrieve writes for transmission as archived transactions or snapshots of the hierarchical data structure maintained in archive storage service 270. Archival management 238 may then periodically or aperiodically update an archived log in archive storage service 270 and generate and send new snapshots to be maintained as part of archived snapshots in archive storage service 270. In this way, the hierarchical data structure can be recreated at any point-in-time, for example by loading a snapshot onto a storage node and applying transactions from an archived log to reach a certain transaction sequence number so that the version of the hierarchical data structure at the storage number is consistent with a specified point-in-time.

Turning back to FIG. 2, transaction log storage 250 may provide a fault tolerant, high performance, durable, log publishing service. Transaction log storage 250 may be used as a commit log underlying strongly consistent distributed applications such as databases, key-value stores, and lock managers, and as illustrated in FIG. 2 directory storage service 220 providing hierarchical data storage, as discussed above. Transaction log storage 250 may provide strong consistency guarantees and support constraints between committed records, to enable features like deduplication, sequencing, and read-write conflict detection. For example, in various requests transaction log storage 250 may determine whether or not to commit changes to hierarchical data structures (e.g., write requests and other modifications) by examining a proposed transaction for conflicts with other committed transactions. Such a feature may provide a fine-grained locking model over the hierarchical data structure (e.g., only those portions of the hierarchical data structure affected by a conflict between transactions may be locked). Transaction log storage 250 may maintain a separate log or chain of log records for each hierarchical data structure, serving as an authoritative definition of the changes to the state hierarchical data structure over time. Transactions may be ordered according to transaction sequence numbers, which may be monotonically increasing to reference the state of a hierarchical data structure at individual points in time. Note that in some embodiments, transaction log storage 250 may be a separate network-based storage service implemented as part of provider network 250 external to directory storage service 220.

Generally speaking, clients 210 may encompass any type of client configurable to submit network-based services requests to provider network 200 via network 260, including requests for directory services (e.g., a request to create or modify a hierarchical data structure to be stored in directory storage service 220, etc.). For example, a given client 210 may include a suitable version of a web browser, or may include a plug-in module or other type of code module that can execute as an extension to or within an execution environment provided by a web browser. Alternatively, a client 210 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application that can interact directly with network-based services platform 200. In some embodiments, client 210 may generate network-based services requests according to a Representational State Transfer (REST)-style network-based services architecture, a document- or message-based network-based services architecture, or another suitable network-based services architecture.

In some embodiments, a client 210 may provide access to network-based services to other applications in a manner that is transparent to those applications. For example, client 210 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to hierarchical data structures in directory storage service 220) to and receive responses from network-based services platform 200 via network 260. In various embodiments, network 260 may encompass any suitable combination of networking hardware and protocols necessary to establish network-based-based communications between clients 210 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based services platform 200. It is noted that in some embodiments, clients 210 may communicate with network-based services platform 200 using a private network rather than the public Internet.

Different types of hierarchical data structures may be stored, managed, and or represented in different ways. FIG. 4 is a block diagram illustrating one example of a data model for a hierarchal data store that provides hierarchical data structures, according to some embodiments. An object may be the basic element of a hierarchical data structure, such as directory structures 410a or 410n and may be represented with circles or squares in the graph depicted of FIG. 4 (e.g., objects 400, 401, 402, 403, 404, 405, 406, 407, and 421). An object may have a globally unique identifier (GUID), zero or more attributes (key, value pairs), and zero or more links to other objects. In some embodiments, a directory may be one type of object which has zero or more child links to other objects, either directories or resources. Directory objects may have zero or one parent directory object, implying that directory objects and inks define a tree structure, in some embodiments. In FIG. 4A, object 401 is an example of a directory object. Object 400 may be a root object that is the logical root multiple directory structures 410 and may not be visible to clients of directory storage service 220. Resource objects (represented by squares such as resource objects 404, 405, 406, and 407) may be leaf objects in a directory structure 410. A resource object may have a unique external Id (e.g., client specified) and client-defined attributes. Resource objects can have more than one parent object (which would allow for some hierarchical data structures to be configured as a Directed Acyclic Graph (DAG). Object 405 in FIG. 4 is an example of a resource object and it has two parents (objects 402 and 403).

In some embodiments, multiple types of resource objects may be implemented. For example, in some embodiments, policy objects may be a type of resource object with two user-defined attributes: a policy type and policy document (e.g., describing a policy applied to applicable objects). For example, resource object 406 in FIG. 4 may be an example of a policy resource object. Another type of resource object may be an index resource object. For example, an index resource object may be an index on various attributes values of objects in the child objects and other descendant objects of the directory object to which the index object is attached. For example, if resource object 407 is an index object, then index object 407 may provide an index object for the attributes of child objects 402 and 403 as well as descendant objects 404, 405, and 406.

In some embodiments, a link may be a directed edge between two objects defining a relationship between the two objects. There may be many types of links, such as client visible link types and another link type for internal operation implementation. In some embodiments, a child link type may create a parent-child relationship between the objects it connects. For example, child link 'bb' connects object 401 and object 403. Child links may define the hierarchies of directory structures 410. Child links may be named in order to define the path of the object that the link points to. Another type of client visible link may be an attachment link. An attachment link may apply a resource object, such as a policy resource object or index resource object, to another resource object or directory object. Attachment links may not define the hierarchical structures of directory structures 410. For example, attachment link 'xx' applies the policy attribute stored in policy resource object 406 to directory object 402. Objects can have multiple attachments. In some embodiments, some attachment restrictions may be enforced, such as a restriction that not more than one policy resource object of any given policy type can be attached to a same object. A non-client visible type of link or implied link type may also be implemented in some embodiments, a reverse link. Reverse links may be used for optimizing traversal of directory structures 410 for common operations like resource object look-ups (e.g., policy lookups). Directory storage service 220 may maintain reverse links in the opposite direction of child and attachment links.

In various embodiments, objects in directory structures 410 can be identified and found by the pathnames that describe how to reach the object starting from the logical root object 400, starting with the link labeled "l" and following the child links separated by path separator "l" until reaching the desired object. For example, object 405 can be identified using the path: "/directoryA/aa/dd". As some objects may be children of multiple directory objects, multiple paths may identify an For example, the following path can also be used to identify object 405: "/directoryA/bb/ee". As directory structures 410 may be a collection of objects whose boundary is defined by the hierarchy of those objects in the collection (e.g., the resulting hierarchical data structure, such as the tree or DAG created by the links between objects). In this way, directory structures 410 may represent separate, independent, or partially independent, organizations.

To store the illustrated directory structures in hierarchical data structure store, the described objects, links attributes, and the like may be modeled after a Resource Description Framework (RDF) data, in some embodiments. To maintain multiple versions of the hierarchical data structures, versioning information may also be included to express how the data has changed over time. RDF data may be structured as (Subject, Predicate, Object) tuples. When including additional versioning information this structure may become: (Subject, Predicate, Object, Version, PreviousVersion). To represent the hierarchical data structures based on RDF, there may be multiple types of RDF predicates. In some embodiments, one type of RDF predicates may represent links of the hierarchical data structure and another type of RDF predicates may represent attributes of the hierarchical data structure. Different types of predicts may represent the hierarchical data structure differently. Link predicates may be between two objects, whereas attribute predicates may be between an object and a value. Since a single object might participate in several predicates of the same type, but with different values, predicates may begin with a common prefix and end in some additional type or naming information to aid in lookups. For example, the version entry in a tuple of a predicate may be the logical timestamp (e.g., transaction sequence number) at which the link or attribute was created, as all changes to a hierarchical data structure may utilize the transaction resolution process provided by transaction log storage 250 and may be assigned an ordered logical timestamp by transaction log storage 250.

Storage nodes may maintain a current version of a hierarchical data structure and past versions of a hierarchical data structure. In at least some embodiments, different respective tables may be maintained for each hierarchical data structure, one table that stores the data for the current version and another table that stores immutable records for the previous versions. In various embodiments a current version table or previous versions table may be accessed to perform various operations for a hierarchical data structure. For example an access request may specify a query: "Find all children for Object whose ID is GUID_401 select GUID_401.child.* from CurrentVersion" or a query: "Find all policies for a resource object who's ID is GUID_405 along all paths to the root. To service such queries, a depth first traversal may be executed along the parent links. At each object along the path to the root, the following internal queries may be executed: internal query 1: "Find if the object has policies: select GUID_405.link.HasPolicy.* from CurrentVersion;" internal query 2: "If the object has policies returned in internal query 1, use the value from the link to get the policy document value from the policy object: select GUID_406.link.PolicyDoc from CurrentVersion;" internal query 3: "Find all parents for current object and perform internal queries 1-3 for each parent object until reaching the root of the directory structure. Please note that previous examples are not intended to be limiting as to the format, structure, syntax, or other ways in which queries may be expressed or processed with respect to hierarchical data structures.

In at least some embodiments, a schema may be applied to a hierarchical data structure, such as a directory or sub-directory illustrated in FIG. 4. FIG. 5 is a logical block diagram illustrating a data model for a schema applicable to a hierarchal data structure in a hierarchical data store, according to some embodiments. Schema 500 may include one or multiple schema classes, which may be organized according to inheritance (e.g., parent and child) links and named links. For example, schema 500 in FIG. 5 illustrates six classes, 501, 503, 505, 507, 509, 511, 513 and 515, which may be arranged according to inheritance links and named links. A schema class may represent a set of attributes that can be attached to an object, in some embodiments. Each individual directory object may have any number of classes associated with it, and for each of which class applied to the object may maintain its own independent set of attributes.

Each schema class may consist of fundamental metadata, as illustrated at 520. The set of schema classes, their constraints, and the relationships between them may constitute a schema, such as schema 500.

A schema may be treated as a set of metadata which can be referred to from a variety of different locations (e.g., from different directory structures). For example, a directory structure references a schema, that directory structure has "applied" the referenced schema. In at least some embodiments, all data within a directory structure that applies a schema must conform to that schema. A schema can be applied to multiple directories, serving as a blue-print for constructing and maintaining the different directories. Once a schema is applied to a directory structure, it may be extended or modified from the originally referenced form of the schema, as discussed below in some embodiments. A schema may itself be modified so that each directory that applies the schema can apply the modified version of the schema (if desired), in some embodiments. Schema contents (e.g., classes, links, etc.) may be consumed by programmatically by clients accessing the directory (e.g., via API calls). By exploring the schema, clients can discover the full set of classes, including attributes and constraints of the classes, which apply to data within the directory.

Inheritance links may define a parent or child schema class for a schema class. I some embodiments, a schema class may reference one or more parent schema classes. Attributes may not be inherited from parent schema classes, in some embodiments. However, when an object is created or associated with a schema class, the object may become an instance of ancestor schema classes as well, in some embodiments. For example, if a "Manager" class has an "Employee" class as a parent, and an "Employee" class has a "Person" class as a parent, assigning a new object to the "Manager" class may automatically assign the "Employee" and "Person" to the object. This may allow for the effect of inheriting the attributes of the classes, but without those attributes crossing into the derived class's attribute set, in some embodiments. Attribute sets for each class may be permanently distinct. Inheritance links may be defined at schema class creation time, and may be immutable, in some embodiments. In this way, concrete assumptions about the presence and absence of attributes for an object can be made, which facilitates modeling object hierarchies, in various embodiments. Immutable class inheritance may also avoid scenarios where a parent class's attributes are either absent (in the case of a parent class added after the object was created) or stranded (in the case of a parent class removed after the object was created). In other embodiments, however, a schema classes may inherit attributes directly from parent schema classes.

Named links may allow one object of a class to hold a reference to another object of another class within the hierarchical data structure without affecting policy inheritance, or implying organizational ownership between objects. Named links, in some embodiments, may represent relationships, acting as an attribute which refers to another object. An example is the relationship between an object of class "employee" and an object of class "laptop" assigned to the employee. The laptop may exist independently of the employee, and may have alternate parentage within the hierarchical data structure which defines permissions, cost centers, or other characteristics which may not be affected by its relationship to the employee assigned to it. The relationship may be navigable due to the named links from either side, but does not affect the application of policy to either item. In some embodiments, named links occupy the same namespace as normal attributes defined in a class, that is, names of attributes and named links may not be the same. A named link attribute may specify a target class. The referenced object may be an instance of the targeted class (or a sub-class thereof). One form of a named link may be a one-to-many mapping (e.g., "user"). Setting the 'user' named link may override any previous setting for that link, essentially moving the attachment from the previously referenced object to the new object. In one embodiment, many-to-many mappings implemented as named link(s) may allow users to specify numerous relations of a specific type, e.g., for device ownership. Such mappings may act as a labelled set of children. Named links may be independent of attachment between objects. Named links may connect any two objects regardless of type. Policy lookup may not consider named links. Constraints on attachments made to objects may not apply to named links. For example, if an object of class 'Employee' can only have other 'Employee' objects as children, defining a named link that links the 'Employee' to the 'device' may additionally allow device objects to be attached to an 'Employee' that are not 'Employee' objects.

A class may be described by a set of class data, such that each object that is an instance of the class may include that data. For example, class data 520 may include a name, description (e.g., for developers, administrators, or consumers), constraints (e.g., an object that is an instance of this class 'must be child of an object that is an instance of class X', 'child objects must be instances of class Y'), permission(s) (access controls for the object), attribute(s) (see attributed data 530 below), named link(s) (as discussed above), inheritance (e.g., parent or child classes), and/or a tag, in some embodiments. One or multiple attributes may be included in a class, and may include various data such as attribute data 530. In this way, a class can describe what data is stored as part of an object and how that data may be interacted with by a client. For example, permissions assigned to a schema class (or attribute or schema) may be considered when requests are made against a schema (to read or apply it), or against an applied schema (to read or write directory data). Permissions may defined on the schema class, but influence all read operations related to objects that are instances of that class. Consider a scenario where a client attempts to read a set of attribute fields on an object. The object may be an instance of a schema class and the schema class's permissions may be included in the authorization of that request. In this way, a schema class's permissions may state a specific set of clients (users or other entity associated with an identity) is allowed to read a specific list of attributes on any instances of that schema class. Similar permissions could be enforced with respect to other operations for objects that are instances of that schema class, including creation and deletion operations. Note that, in some embodiments, permissions may only apply to the set of attributes for a specific schema class, and not for the directory object itself, which is an instance of the schema class. For instance, a client could be able to read and modify one set of attributes of an object that is an instance of one schema class, and be unable to read another set of attributes on the same object according to different permissions for the other set of attributes of a different schema class (which the object is also an instance of).

Attribute data 530 may include attribute name, description, type (e.g., string, int, code, code pointer, etc.), execution data (see execution data 540), indexed (e.g., a type of data that is indexed in the hierarchical data structure index), permissions (e.g., who can read/write the attribute data value), and default value (e.g., which may be provided if not overwritten for a particular instance of the class). Different attribute data types may include, but are not limited to, String, Integer, Boolean, Decimal, and Date, to facilitate sorting or selecting objects based on inequality comparators (e.g., querying for a bounded or unbounded interval in a range). In some embodiments, attributes may be defined as "shared". Shared attributes may participate in a directory-global namespace which may be managed by schema management 236 in FIG. 2. When two schema classes define shared attributes with the same name, the values of those shared attributes may be shared across the schema classes. For example, if a "User" schema class is defined with a shared "surname" attribute, and an "Employee" schema class attribute is also defined with a shared "surname" attribute, an update of one attribute will also update the other. In some embodiments, only one value of a shared attributed may be stored. In order to update a shared attribute, a new value may have to be validated for all attribute definitions of the different class schemas that share the attribute and apply to the object, in some embodiments. Attribute constraints may be automatically validated or validated/interacted with as part of execution data of client-specified code, in some embodiments. Constraints may include min/max values, min/max lengths (e.g., for strings), acceptable character sets, or regular expression-based validation. In some embodiments, an attribute may be code that is triggered for execution when an object that is an instance of the class that includes the attribute is accessed (e.g., for create, read, update, or delete).

Some classes, such as classes 509 and 511 may be application specific extensions that may only be read or otherwise accessed by the application that created them (or an application for which the creating application granted access permissions). Permission(s) values in the class data may indicate that the class information is application specific by including an identifier or other value for determining whether or not an access request is from or otherwise associated with the application that has privileges to access the attribute data of the class. Alternatively, in some embodiments, application specific extensions may be made automatically available (e.g., for read access) to other applications. By allowing applications, to create and include additional classes in a schema, setting, configuring, or otherwise determining the various features of class data 520 and attribute data 530 for the application, applications can enhance the functionality of the schema for application operations beyond storing additional data. For instance, by providing applications with flexibility to determine class permissions, constraints, named links, and tags, applications can extend the operability of the schema, and thus the directory.

Figure 10:
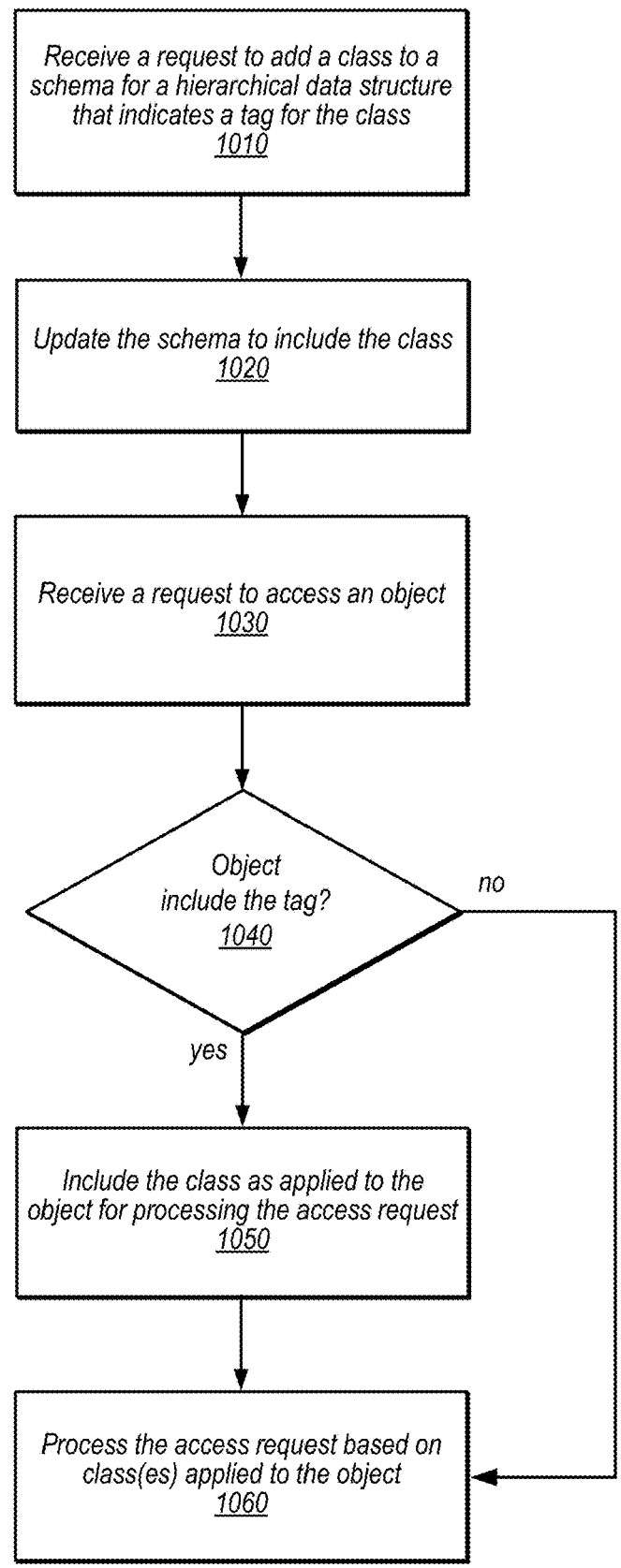
FIG. 10 is a high-level flowchart illustrating methods and techniques to update an object based on a tag, according to some embodiments.

Tags, such as tag 540, may be included in some classes to perform operations with respect to objects using a collection of schema classes (including application specific classes) that are assigned or marked with the same tag that group the classes together for performing different operations, as discussed below with regard to FIGS. 10 and 11. For example, objects created using a tag may automatically become an instance of the classes associated with the tag, even as that collection of classes may change over time (as classed are added, like application specific classes, or as classes are removed from the tag). In this way, an object can evolve over time as the schema evolves. For example, tags can provide an application with defense against updates to the schema over time, especially when accessing object which was created before the updates.

Consider a scenario where an application relies upon a schema with a "PlayerData" class, intended to represent a player in the application's publicly released game. The game is successful, and tens of thousands of objects are created using this class, and over time the application evolves to assume that "PlayerData" class is synonymous with a conceptual "player" in the game. In order to commoditize the game, more information may be needed in the schema, such as a "PaymentInstrument" class for the players. Without tags, backfill operations would have to be performed to include "PaymentInstrument" data on existing objects. Using tags, however, this problem can be avoided. Instead of creating generic objects with a "PlayerData" class, the application can create objects by tag (e.g., using an API such as client.createObjectByTag("# player")). In this way, an object is created which is tagged as a "player", and consists of all classes for the player tag. When existing objects, created prior to the "PaymentInstrument" application extension, are loaded for processing an access request, a request handler can identify the "player" tag on the object and provide the existing PlayerData class and a PaymentInstrument class (consisting entirely of default values for the attributes). Tags allow the decoupling of the conceptual intent ("create a player") from the specific classes applied to the object ("create an object with the PlayerData class"), thereby letting the application remain agnostic about future changes (which may be added by other applications extending the schema).

New classes, including application specific classes that extend the schema, can be added to an existing tag, in various embodiments. In at least some embodiments, adding a class to a tag may be limited to classes that do not have any required attributes. In this way, a backfill operation may not have to be performed on existing objects. The authoring application of each schema class may determine which tags are associated with it. Consider a scenario, where a new directory is set up using a published schema, GamingPlatform version 1. An application (e.g., implementing a game that executes using the directory for the gaming platform) may extend the schema by creating a new class and tagging it with the standard "# player" tag, so that all players are created using the new class. Then, another version of GamingPlatform schema is published, version 2. Part of version 2 extends the "# player" definition further by adding a "PlayerExt" class. The new "PlayerExt" class will appear on all existing "# player" objects.

A schema may be stored in various ways. In some embodiments, a schema may be stored as a document (e.g., a JSON document) in a standard, hierarchical structure or in another language independent data format. The document may contain all shape-related information for the schema, including attribute type, validation rules, indices, and other auxiliary information. Indices, and information which loses context when moved between accounts (e.g., permissions, references to external resources like external code execution platforms, etc.), may be represented separately in a manner which makes them easily distinguishable from the core schema shape information (e.g., in a separate JSON document). Permissions for a schema may be stored outside of the document, in some embodiments. For example, schema classes may be represented as children of a "schema class" node attached to the root node, forming the structural schema class hierarchy. Permissions may then be associated with each of the schema classes, in some embodiments, which can then be evaluated similar to perform a directory structure lookup operation as discussed above. Additional, clients can register for directory update event notifications without requiring mutation of the schema definition, in some embodiments.

Figure 6:
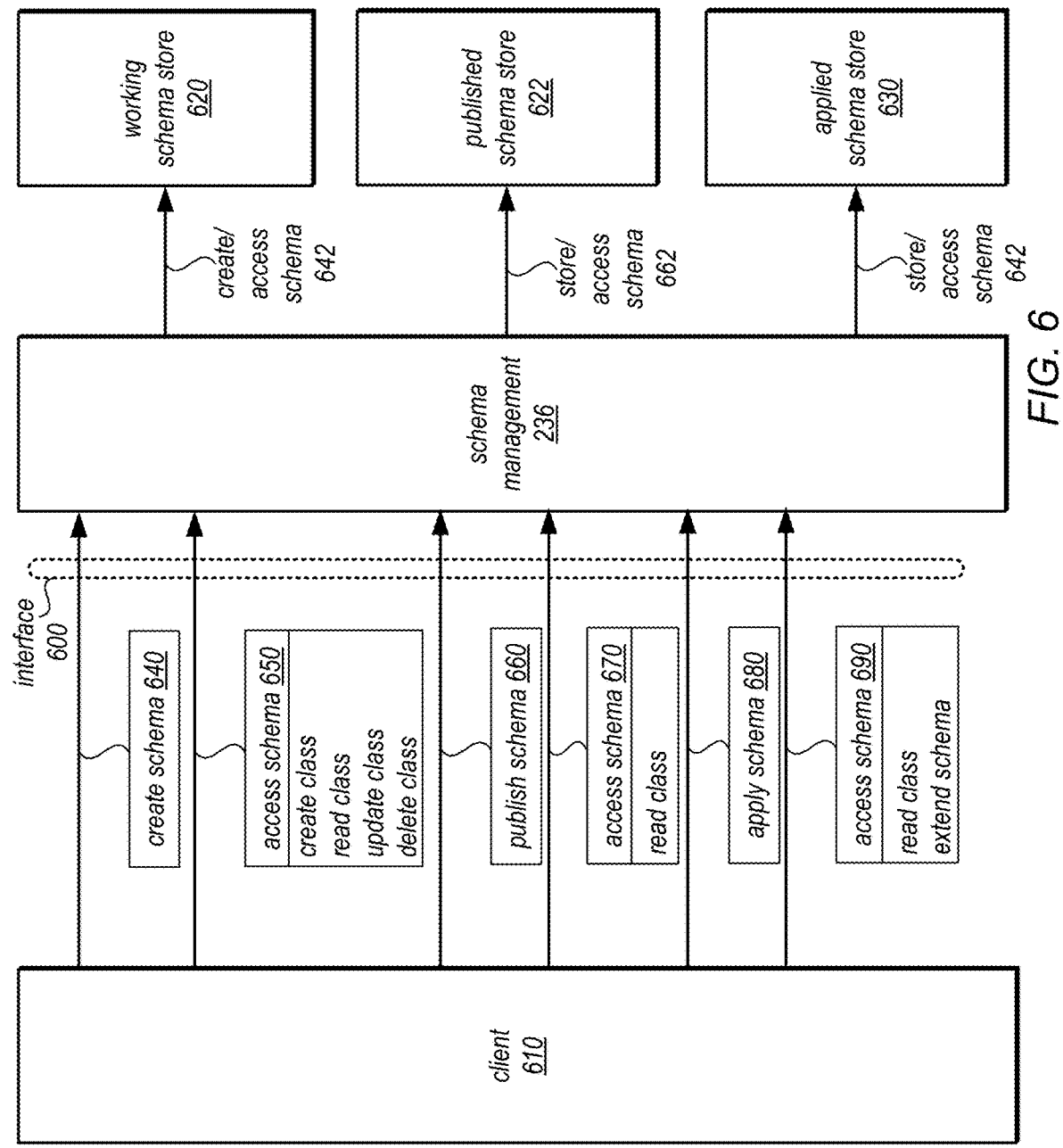
FIG. 6 is a logical block diagram illustrating interactions to manage a schema applicable to a hierarchical data structure, according to some embodiments.

FIG. 6 is a logical block diagram illustrating interactions to manage a schema applicable to a hierarchical data structure, according to some embodiments. A schema, as discussed above with regard to FIG. 5, may be maintained in different states. In some embodiments, schema states may include a schema in a working state, published state, or applied state. Different versions of the schemas in working, published, or applied states may also be maintained. In some embodiments, the interactions with a schema may change dependent on the state of the schema being interacted with. For example, client 610 may send a request 640 to create a schema via interface 600 (e.g., via a graphical user interface (GUI), command line interface (CLI), and/or a programmatic interface (e.g., an API)). Schema management 236 may create 642 or allocate space for the schema in working schema store 620 (which may be stored on one more storage nodes 240 or another data store). In the working state, client 610 may submit access requests to schema 650 which may include requests to create a class, read a class, update a class, or delete a class. Such access requests may be performed 642 by schema management 236 with respect to the schema in working schema store 620. For example, attribute values for schemas (including code or pointers to code) may be added or changed, as part of an access schema request 650.

Client 610 may submit a request to publish a schema 660 in working state. For example, the request may include an identifier for the schema, as well as a publication destination or access controls for the published schema. In some embodiments, schema management 236 may move or otherwise store 662 the schema in a published schema store 622 (which may be separate from working schema store 620 or located in a different part of the same data store as working schema store 620). Once published, the access operations available to client 610 may change. A published schema, for example, may not be altered or modified. As illustrated in FIG. 6, client 610 may access schema 670 and may include operations such as a request to read a class from the schema, which schema management 236 may perform by accessing the schema 662.

Client 610 may submit a request to apply a schema 680 to a hierarchical data structure (e.g., such as a directory or sub-directory illustrated in FIG. 4). The request 680 may identify the hierarchical data structure (e.g., by identifier, name, or location). Schema management 236 may store a copy of the published schema 642 to the applied schema store 630 for the hierarchical data structure (e.g., which may be included in or co-located with a data store that stores the hierarchical data structure, such as on the same storage node(s) that store a copy of the hierarchical data structure). Client 610 may also submit requests to access the schema 690, which may read classes in the applied schema or request modifications to the schema that extend the schema, as discussed above with regard to FIGS. 1 and 5 and below with regard to FIGS. 8-11. For example, additional classes may be added, inheritance links added, or named links added, in some embodiments, that are specific to a particular application. Modifications that remove or alter classes may be added, in some embodiments, after the modifications are confirmed to not conflict with the published schema that is the source of the applied schema, as discussed below with regard to FIG. 9. For conflicting modifications, the request to modify the schema (e.g., by an application) may blocked or denied, and may include an error response indicating the conflict (e.g., providing the identity of the conflicting portions of the class), in some embodiments.

Figure 7:
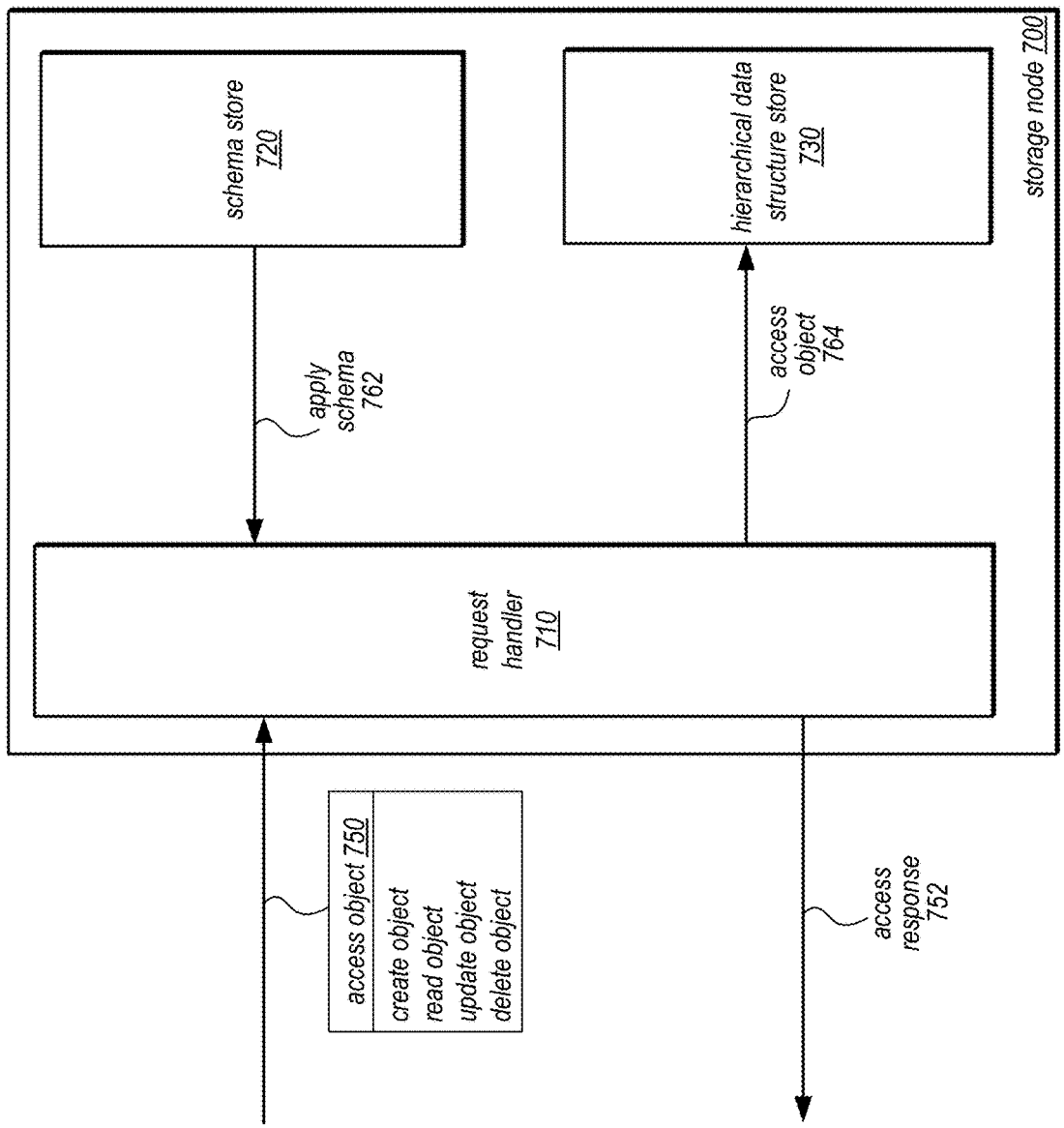
FIG. 7 is a logical block diagram illustrating interactions to access an object in a hierarchical data structure that has application specific extensions to the schema, according to some embodiments.

FIG. 7 is a logical block diagram illustrating interactions to access an object in a hierarchical data structure that has application specific extensions to the schema, according to some embodiments. Storage node 700, may be storage node like storage nodes 240 or 300 discussed above with regard to FIG. 3. Storage node 700 may implement request handler 710, like request handler 310, to handle a request to access an object 750 (e.g., dispatched to storage node by routing layer 232 in FIG. 2). Access object request 750 may identify the hierarchical data structure (e.g., by including a name or identifier), the object (e.g., by including a name, identifier, or location, such as a file path), and/or information indicating or describing the type of access request (e.g., requests to create an object, read an object, update an object, or delete an object), input parameters or other data to perform the access request (e.g., schema class and attribute values for the object), and/or access credentials to access the hierarchical data structure or object.

Request handler 710 may receive the access request 750. Request handler 710 may parse the access request to identify the schema. Request handler 710 may then access the schema 762 in schema store 720 to retrieve the schema for application 764. For example, the access request may identify the object (e.g., according to an identifier for the object or a location, such as a directory path), the schema applied to the directory, the schema class, and the schema attribute to read or to read or update. Request handler 710 may access the schema, confirm that the object is an instance of the schema class, and apply the schema class to the object 764 (e.g., by identifying the name, type, format, or other information for locating the attribute within hierarchical data structure store 730). Request handler 710 may then access 764 the object in hierarchical data structure store 730 to perform the request access according to the applied schema. The object may then be returned in response to the access request (e.g., data values, etc.) or some indication of completion of the access request (e.g., acknowledgement of an update or delete operation), which in turn may generate a response 752 for access request 750 (e.g., indicating success, failure, requested data, etc.), in some embodiments. In at least some embodiments, request handler 710 may apply permissions specified in the identified schema (e.g., limiting access to a particular application) and/or may perform validation of the operation (e.g., validating whether the access request attempts to delete a "required" attribute value). Request handler 710 may reject access requests 750 without permission to perform the access request or that request an invalid operation, in some embodiments (e.g., sending a response indicating an error code or exception).

Figure 8:
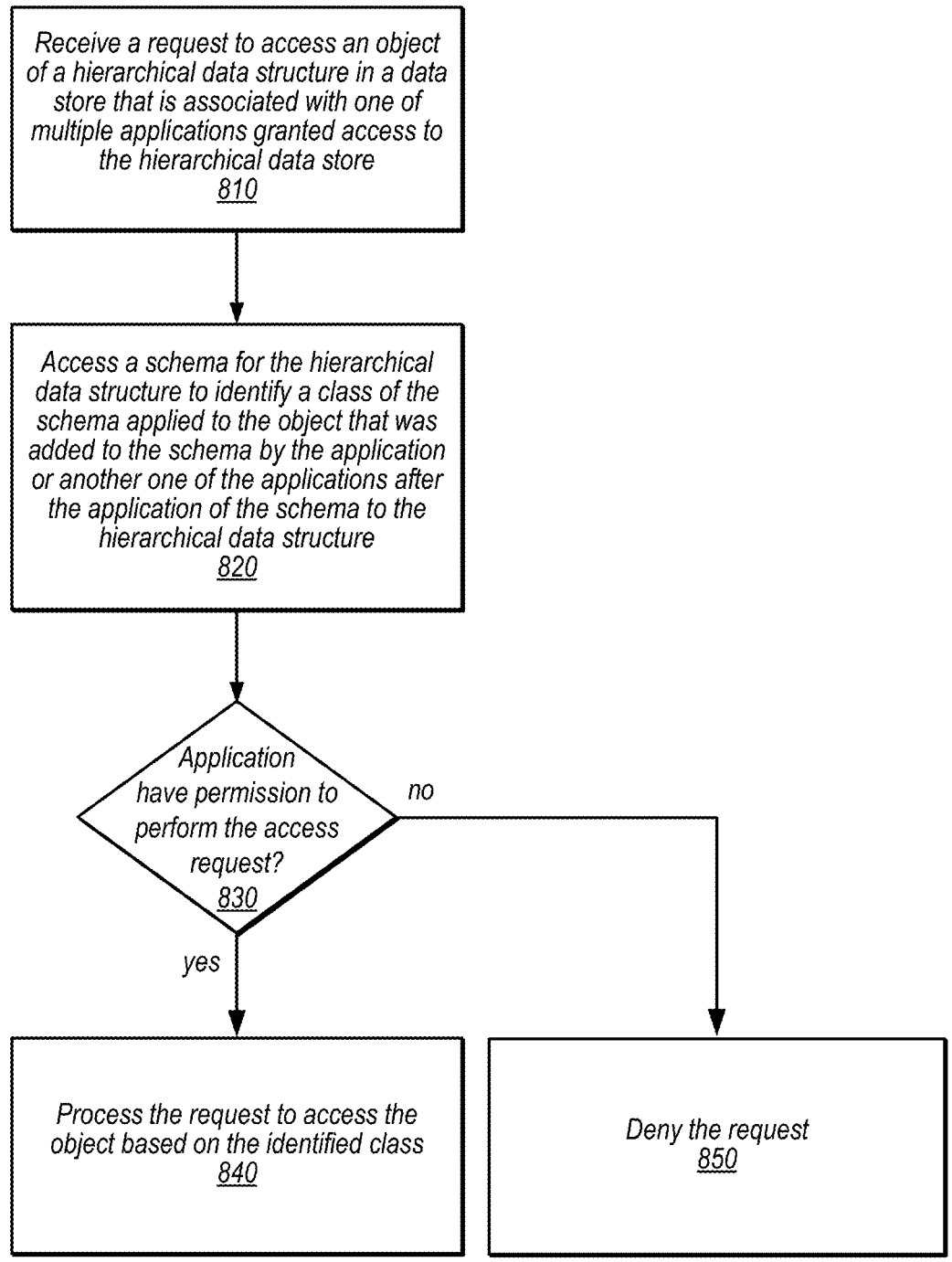
FIG. 8 is a high-level flowchart illustrating methods and techniques to provide access to a hierarchical data structure with application specific extensions to a schema for the hierarchical data structure, according to some embodiments.

The directory storage service, access requests, and other techniques discussed in FIGS. 2 through 7 provide examples of a distributed hierarchical data store storing a hierarchical data structure for a client and implementing application specific extensions to a schema applicable to a hierarchical data structure in different scenarios. However, various other types of hierarchical storage systems may implement extensions to a schema for a hierarchical data structure, which may utilize other numbers of types of components. FIG. 8 is a high-level flowchart illustrating methods and techniques to provide access to a hierarchical data structure with application specific extensions to a schema for the hierarchical data structure, according to some embodiments. Various different distributed data stores including the embodiments described above may implement the techniques described below.

As indicated at 810, a request may be received to access an object of a hierarchical data structure stored in a hierarchical data store, in various embodiments, that is associated with one application out of multiple applications granted access to the hierarchical data store. The request may be received according to an interface, including a graphical user interface (GUI), command line interface (CLI), and/or a programmatic interface (e.g., an API), in one embodiment. The request may specify the hierarchical data structure (e.g., by name, identifier, or location). Similarly, the request may specify the object (e.g., by name, location, or identifier for an existing or to be created object). The request may also specify the schema class and/or attribute of the schema class to access, in some embodiments. As discussed above, with regard to FIG. 7, different types of access requests can be received. For example, in some embodiments, an access request to create the object, read the object, update the object, or delete the object may be received.

As indicated at 820, a schema applicable to the hierarchical data structure may be accessed, in some embodiments, to identify a class of the schema applied to the object. The class may be a class added to the schema after the application of the schema to the hierarchical data structure by one of the applications granted access to the schema, in some embodiments. The access request may be received from the application that added the class or from a different application, in some embodiments. For example, as discussed above with regard to FIG. 6, different applications may access and extend the schema by submitting requests to add a class to the schema. In some embodiments, the request may include an identifier for the schema and class, while in other embodiments the mapping between applications and schemas and classes may be maintained as part of a request handler or other component performing the technique in FIG. 8. For example, a pointer, link, identifier, or other association mapping a schema to the hierarchical data structure may be maintained as part of the hierarchical data structure so that when the hierarchical data structure is accessed, the schema applied to the hierarchical data structure is identified. The hierarchical data structure may be stored in a different format than the schema, in some embodiments. For instance, the schema may be stored according to human-readable text format (e.g., Javascript Object Notation (JSON)), instead of in a hierarchical structure. The schema may be parsed, scanned, or otherwise consumed to determine what portions of the schema are applicable to the object. For example, an inheritance determination may be performed to determine the class(es) of which the object is an instance, according to inheritance information for each class included in the schema. An object may be an instance of multiple different classes, but some of the classes may be specific to other schemas.

As indicated at 830, a determination may be made as to whether an application has permission to perform the access request, in various embodiments. For example, in some embodiments, application added classes to a schema may be available when processing access requests from any application granted access to the hierarchical data structure. An application registry, for instance, may be implemented that allows applications to register and receive identity or authentication credentials that may be included in requests submitted by the application to the hierarchical data store so that access to a hierarchical data structure may be limited to registered applications presenting the proper credentials. In some embodiments, access rights may be fined grained, so that permission to perform an access request may be different depending on the identity of the application requesting the access request. For example, permissions or other identity based restrictions for the access request may be imposed (e.g., as defined in the class, as discussed above with regard to FIG. 5). For example, permissions can restrict access, providing limited (e.g., read privileges) or no access to attribute values for an added class based on the identity of the application. In some embodiments, default permissions may be implemented so that, for instance, an application that authored the class has read and write privileges for attributes in the class, while other applications may be limited to read privileges. Thus, the permission determination indicated at 830 may evaluate the identity of the application, the type of access request, or both to determine whether the application has permission to perform the operation. Other types of verification or validation operations for an access request (not illustrated) may be performed, such as determining whether the access request specifies a valid operation (e.g., an existing class or attribute, a valid operation with respect to the attribute, such as deleting a required attribute value, etc.).

For those applications without permission, the request may be denied, as indicated at 850, in various embodiments. A denial response may be sent, in some embodiments, indicating a reason for denying the request (e.g., lacking permission, invalid or mal-formed request, etc.). For those applications with permission, the request to access the object may be performed based on the identified class (e.g., updating an attribute value in the class or reading an attribute value from the class).

Figure 9:
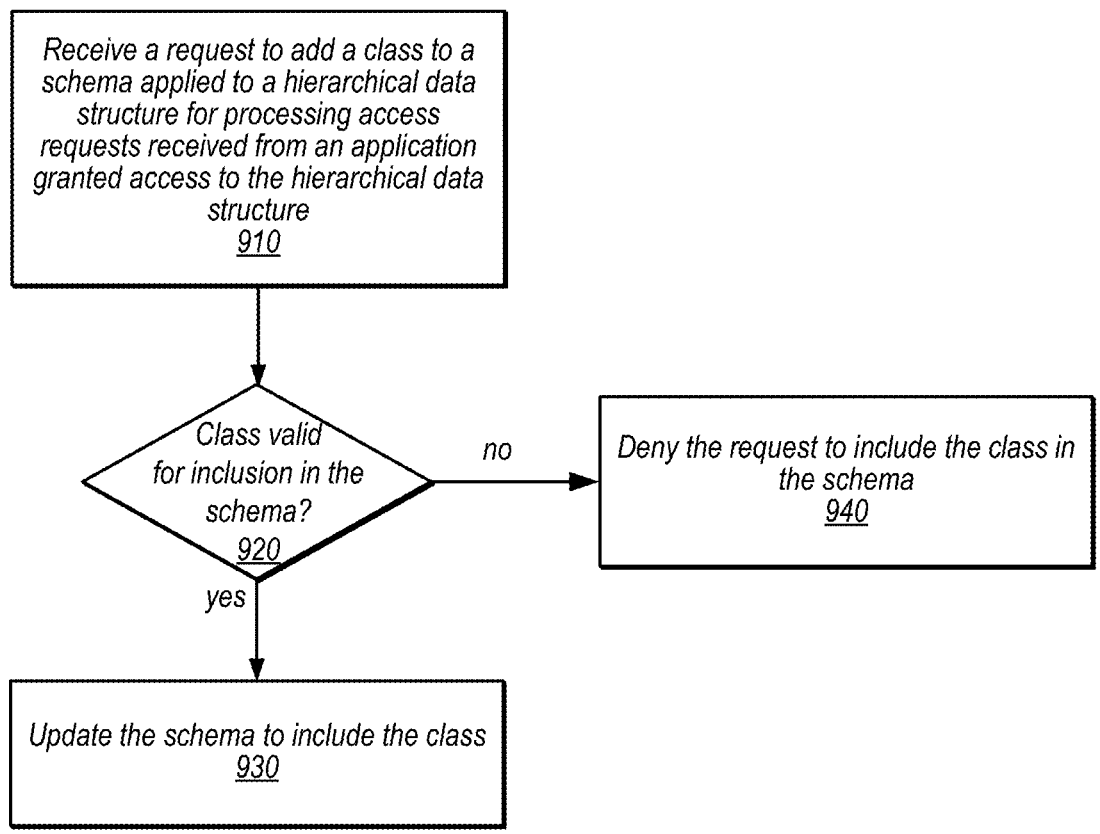
FIG. 9 is a high-level flowchart illustrating methods and techniques to add a class to a schema that extends the schema for an application that accesses a hierarchical data structure, according to some embodiments.

FIG. 9 is a high-level flowchart illustrating methods and techniques to add a class to a schema that extends the schema for an application that accesses a hierarchical data structure, according to some embodiments. As indicated at 910, a request to add a class to a schema applied to a hierarchical data structure for processing access requests received from an application granted access to the hierarchical data structure may be received, in some embodiments. For example, the request may be received via an interface, including a graphical user interface (GUI), command line interface (CLI), and/or a programmatic interface (e.g., an API), in one embodiment. In some embodiments, the class may be included as part of the request, or may be uploaded or transmitted as part of a subsequent transmission. For example, a GUI may include a user interface element allowing a user to manually enter the class data into a text editing space before submitting the class in the text editing space to be included in the schema.

As indicated at 920, validity of the class for inclusion in the schema may be evaluated, in some embodiments. For example, different extension constraints may be enforced with respect to application specific classes that extend an applied schema. In one embodiment, constraint may be applied on the format or type of attributes included in the class. In one embodiment, a constraint may be applied on the naming convention of the class or attributes within the class. For example, a global namespace may be maintained with respect to class names so that no class in a schema may be named the same as another class. Similarly, a schema may reserve some words so that they cannot be used as a class name or attribute value in some embodiments. In one embodiment, a constraint may be applied on the inheritance of the class (e.g., one application specific extensions cannot inherit from another application specific extension). Various combinations of constraints may be applied or enforced, in different embodiments. Thus, the previous examples are not intended to be limiting. Validation may also be performed so that the addition of the schema class does not interfere with the operation of any other applications that utilize the schema as part of accessing the hierarchical data structure. For example, a constraint may be implemented so that a class is backward compatible with all other pre-existing classes (including pre-existing extensions already included by the same and/or other applications). The backward compatible constraint may include conditions such as only allowing additional classes that include attributes that are not mandatory or required (e.g., can have null values or default values generated).

As indicated by the negative exit from 920, the request to include a class that it is determined to be invalid may be denied, as indicated at 940. For example, a response indicating request failure may be sent. In at least some embodiments, the response may include or indicate validation errors (to help identify corrections that could be performed to make the class valid). As indicated by the positive exit from 920, a class that is determined to be valid may be stored for inclusion in the schema. In some embodiments, the schema document or data structure may be directly updated. For example, a JSON storing the schema or other document in the applied schema store may be updated directly. In some embodiments an additional or addendum document or data object may be created. In some embodiments, the schema may be stored as hierarchical data structure, and thus inclusion of the class may include creating a new object the hierarchical data structure of the schema.

Tags, as discussed above with regard to FIG. 5, may be applied to group or collect classes together for performing different operations in a hierarchical data structure. For example, operations that are invoked using a tag can dynamically determine what classes are applicable and then perform the operation based on the identified classes. In this way, class creators can easily add new classes that can be accessible to existing objects by associating the new classes with a tag for a class that the objects are already instances of, instead of manually applying the new classes to each existing object. FIG. 10 is a high-level flowchart illustrating methods and techniques to update an object based on a tag, according to some embodiments.

As indicated at 1010, a request may be received to add a class to a schema for a hierarchical data structure that indicates a tag for the class. Tags may be publicly advertised or accessible when accessing a directory, by accessing the schema data for a class (e.g., as illustrated in FIG. 5 above). Tags may also be created for a specific application (e.g., by sending a request to create a tag for a schema or by including the tag in a class creation or object creation request). As indicated at 1020, the schema may be updated to include the class. For example, a JSON storing the schema or other document in the applied schema store may be updated directly, or an additional or addendum document or data object may be created. In some embodiments, the schema may be stored as hierarchical data structure, and thus inclusion of the class may include creating a new object the hierarchical data structure of the schema. As part of updating the schema, the data of the class may include the tag indicated in the request at 1010.

In addition to associating with classes with tags, objects may also be associated with a tag, in some embodiments. For example, as discussed below with regard to FIG. 11, an object can be created according to a tag, including the tag as part of the object. In some embodiments, a request to "tag" an object with a tag may be received and performed so that the object includes the tag (e.g., in object data or metadata in the hierarchical data structure). Operations, such as access requests, can then be performed according to the tag. As indicated at 1030, in at least some embodiments, an access request may be received for an object. When processing the access request, a determination may be made, as indicated at 1040, as to whether the object includes a tag (e.g., the tag indicated at 1010), in various embodiments. For example, consider a scenario where the added class is a "Player Payer Instrument Class" that indicates the tag "player" and the object targeted by the access request includes the tag "player." A lookup or evaluation of the existing object may identify the tag as included in or associated with the object.

If the object includes the tag, then as indicated at 1050 the class may be included as applied to the object for processing the access request (e.g., along with any other classes that were manually applied using a request to apply the class to the object). Including the class may make the class, and thus attributes of the class, available for processing the access request. Thus, when processing the request based on other class(es) applied to the object, as indicated at 1060, the attribute of the classes may be available to serve the access request. For example, if the request attempts to update a value for an attribute in "Player Payer Instrument Class" then the access request would succeed even though the "Player Payer Instrument Class" was never explicitly applied via a manual request to the object. If the object, were not to include the tag, then only those classes applied to the object (e.g., manually or via another tag) would be applicable for processing the access request, as indicated by the negative exit from 1040. Thus, in the previous example, the access request for the attribute value in "Player Payer Instrument Class" would fail as that class has not been applied to the object.

Figure 11:
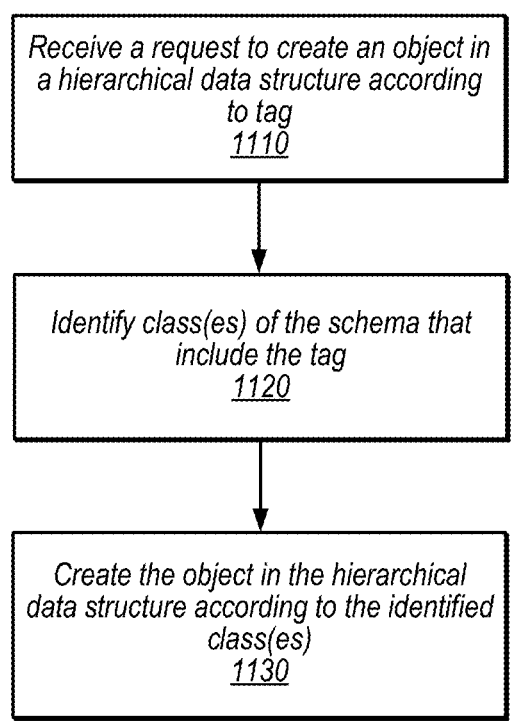
FIG. 11 is a high-level flowchart illustrating methods and techniques to create an object in a hierarchical data structure according to a tag, according to some embodiments.

FIG. 11 is a high-level flowchart illustrating methods and techniques to create an object in a hierarchical data structure according to a tag, according to some embodiments. As indicated at 1110, a request may be received to create an object in a hierarchical data structure according to a tag. For example, an API or other interface may allow a creation request to include a tag identifier (as a field or flag within the request) or may include a specific tag interface to create an object according to a tag. As discussed above, tags may be advertised or otherwise provided for a schema as part of a published version of a schema. Like extensions to the schema, new tags can be created that are specific to the application that created the tag, allowing for tag-based creation (or updates as discussed above with regard to FIG. 10) to be performed using tags that are only visible to and under the control of one application. In other embodiments, tags may be available to any application granted access to the hierarchical data structure.

As indicated at 1120, class(es) of the schema that include the tag may be identified. For example, an index, list, or other data structure may be maintained for each tag that is utilized in the schema in order to perform a quick look up to find classes that include a desired tag. In some embodiments, the schema may be parsed, traversed, scanned, or otherwise evaluated to identify the class(es) associated with a tag. As indicated at 1130, the object may then be created in the hierarchical data structure according to the identified classes, in some embodiments. For example, default values for attributes defined in the class(es) may be included and/or space allocated in the object to store subsequently received values for the attributes of the class(es). The object may also be marked with or otherwise include the tag in order to perform other tag-based operations, such as applying subsequently added schema classes as discussed above with regard to FIG. 10.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 12:
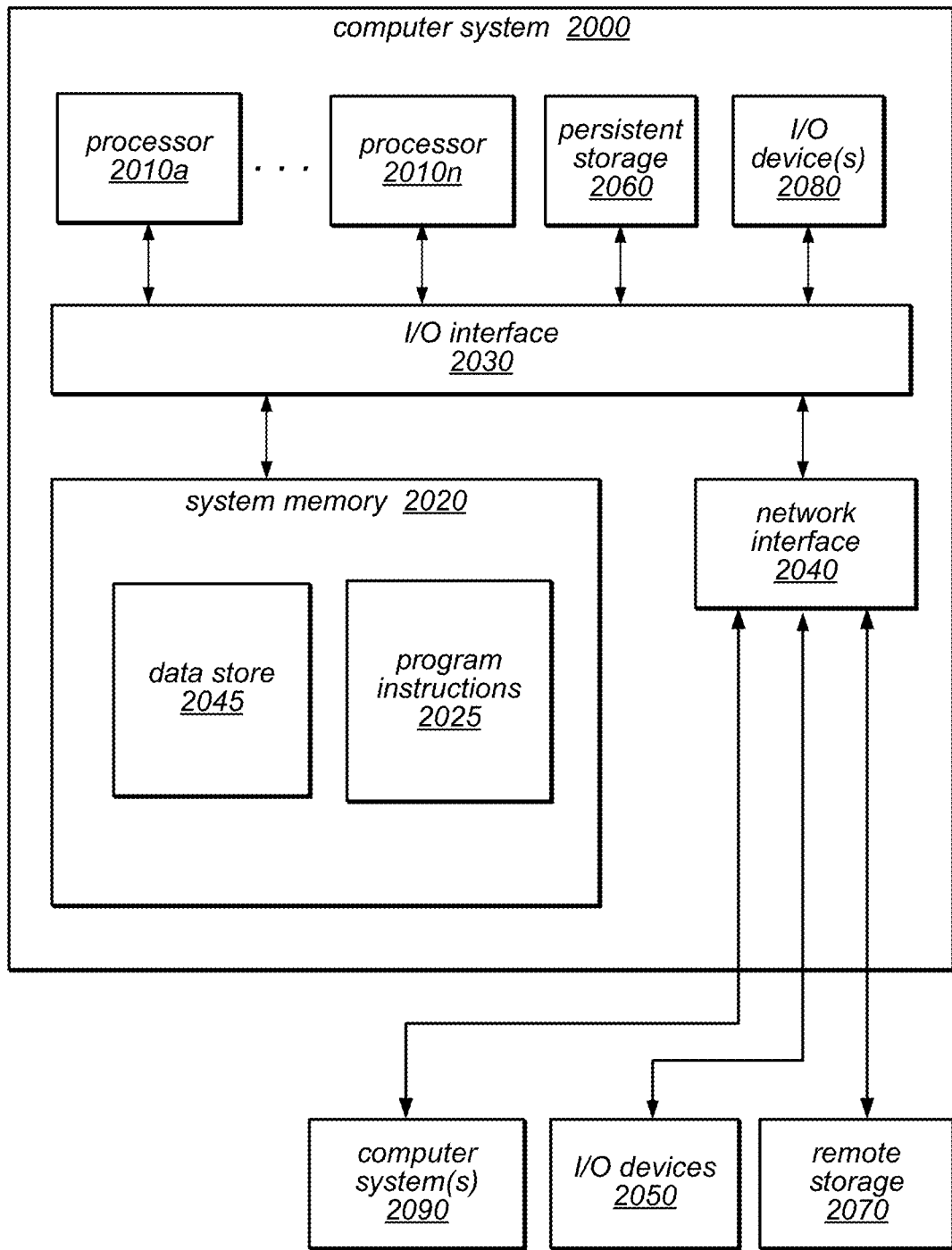
FIG. 12 is an example computer system, according to various embodiments.

FIG. 12 is a block diagram illustrating a computer system that can implement the distributed data store application specific schema extensions for a hierarchical data structure, according to various embodiments, as well as various other systems, components, services or devices described above. For example, computer system 2000 may implement hierarchy storage nodes that maintain versions of hierarchical data structures or components of a transaction log store that maintain transaction logs for hierarchical data structures, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 1010 (any of which may include multiple cores, which may be single or multi-threaded) coupled to a system memory 1020 via an input/output (I/O) interface 1030. Computer system 2000 further includes a network interface 1040 coupled to I/O interface 1030. In various embodiments, computer system 2000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 2000 also includes one or more network communication devices (e.g., network interface 1040) for communicating with other systems and/or components over a communications network (e.g. Internet, LAN, etc.). For example, a client application executing on system 2000 may use network interface 1040 to communicate with a server application executing on a single server or on a cluster of servers that implement one or more of the components of the directory storage systems described herein. In another example, an instance of a server application executing on computer system 2000 may use network interface 1040 to communicate with other instances of the server application (or another server application) that may be implemented on other computer systems (e.g., computer systems 1090).

In the illustrated embodiment, computer system 2000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 2000 (or a distributed application or operating system operating thereon) may store instructions and/or data in persistent storage devices 1060, as desired, and may retrieve the stored instruction and/or data as needed. For example, in some embodiments, computer system 2000 may host a storage system server node, and persistent storage 1060 may include the SSDs attached to that server node.

Computer system 2000 includes one or more system memories 2020 that can store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a hierarchy storage nodes that maintain versions of hierarchical data structures or components of a transaction log store that maintain transaction logs for hierarchical data structures, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 2000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be implemented as described herein. For example, the information described herein as being stored by the hierarchy storage nodes or transaction log store described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 2000 and other devices attached to a network, such as other computer systems 1090 (which may implement embodiments described herein), for example. In addition, network interface 1040 may allow communication between computer system 2000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 1050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a directory service, the directory service configured to:
   receive a request to create an extension to a schema on an object of a directory hosted by the directory service, wherein the request is to create the extension for a first application;

create the requested extension to the schema on the object of the directory for the first application;

receive a request to access the object for a second application;

determine that the second application has permission to access the extension to the schema on the object; and perform the request to access the object for the second application.

2. The system of claim 1, wherein the directory service is further configured to:

receive a second request to access the object for a third application;

determine that the third application does not have permission to access the extension to the schema on the object; and deny the second request to access the object for the third application.

3. The system of claim 1, wherein the permission to access the extension is limited to a read.

4. The system of claim 1, wherein the access request is a read request.

5. The system of claim 1, wherein the access request is a write request.

6. The system of claim 1, wherein the directory service is further configured to delete the extension to the schema on the object responsive to a request to delete the extension.

7. The system of claim 1, wherein the directory service is offered as part of a provider network, wherein the first application and the second application are implemented on one or more other services offered by the provider network.

8. A method, comprising:

receiving, at a directory service, a request to create an extension to a schema on an object of a directory hosted by the directory service, wherein the request is to create the extension for a first application;

creating, by the directory service, the requested extension to the schema on the object of the directory for the first application;

receiving, at the directory service, a request to access the object for a second application;

determining, by the directory service, that the second application has permission to access the extension to the schema on the object; and performing, by the directory service, the request to access the object for the second application.

9. The method of claim 8, further comprising:

receiving, at the directory service, a second request to access the object for a third application;

determining, by the directory service, that the third application does not have permission to access the extension to the schema on the object; and denying, by the directory service, the second request to access the object for the third application.

10. The method of claim 8, wherein the permission to access the extension is limited to a read.

11. The method of claim 8, wherein the access request is a read request.

12. The method of claim 8, wherein the access request is a write request.

13. The method of claim 8, further comprising deleting the extension to the schema on the object responsive to a request to delete the extension.

14. The method of claim 8, wherein the directory service is offered as part of a provider network, wherein the first application and the second application are implemented on one or more other services offered by the provider network.

15. One or more non-transitory, computer-readable storage media, storing program instructions that when executed on or across one or more computing devices, cause the one or more computing devices to implement:

receiving, at a directory service, a request to create an extension to a schema on an object of a directory hosted by the directory service, wherein the request is to create the extension for a first application;

creating, by the directory service, the requested extension to the schema on the object of the directory for the first application;

receiving, at the directory service, a request to access the object for a second application;

determining, by the directory service, that the second application has permission to access the extension to the schema on the object; and performing, by the directory service, the request to access the object for the second application.

16. The one or more non-transitory, computer-readable storage media of claim 15, storing further instructions that when executed on or across the one or more computing devices cause the one or more computing devices to further implement:

receiving, at the directory service, a second request to access the object for a third application;

determining, by the directory service, that the third application does not have permission to access the extension to the schema on the object; and denying, by the directory service, the second request to access the object for the third application.

17. The one or more non-transitory, computer-readable storage media of claim 15, wherein the permission to access the extension is limited to a read.

18. The one or more non-transitory, computer-readable storage media of claim 15, wherein the access request is a read request.

19. The one or more non-transitory, computer-readable storage media of claim 15, wherein the access request is a write request.

20. The one or more non-transitory, computer-readable storage media of claim 15, storing further instructions that when executed on or across the one or more computing devices cause the one or more computing devices to further implement deleting the extension to the schema on the object responsive to a request to delete the extension.

* * * * *